Patented Sept. 19, 1933

1,927,115

UNITED STATES PATENT OFFICE 1,927,115

WATER-INSOLUBLE MONO-AZODYESTUFF AND FIBER DYED THEREWITH

Heinz Eichwede, Frankfort - on - the - Main - Hochst, Germany, assignor to General Aniline Works, Inc., New York, N. Y., a corporation of Delaware No Drawing. Application October 18, 1932, Serial No. 638,384, and in Germany November 13, 1931

10 Claims. (Cl. 260—95)

The present invention relates to water-insoluble monoazodyestuffs and to fiber dyed therewith, more particularly it relates to dyestuffs corresponding to the following general formula:

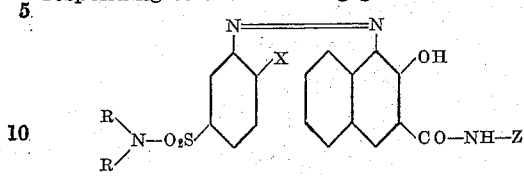

wherein R stands for a radical of the benzene series, X stands for hydrogen, halogen, an alkyl or alkoxy group and Z stands for a radical of the benzene or naphthalene series.

I have found that dyestuffs dyeing clear scarlet to bluish-red tints are obtained by coupling a diazo-compound of a base of the general formula:

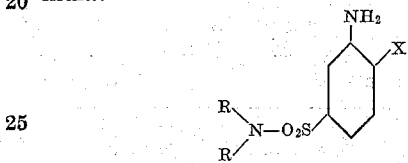

wherein R represents a radical of the benzene series and X represents hydrogen, halogen, an alkyl or alkoxy group, in substance, on the fiber, or on any of the usual substrata which are adapted for the production of lakes, with an arylide of the 2.3-hydroxynaphthoic acid, such dyestuff components, however, being excluded which contain groups that would render the dyestuffs soluble in water as, for instance, the sulfonic or the carboxylic acid group. The dyestuffs are distinguished, in general, by a good fastness to light; when produced on the fiber, moreover they possess a good fastness to soaping. The soaping test is carried out by boiling 2 grams of dyed material for half-an-hour with 200 cc. of water containing 1 gram of Marseilles' soap and 0.6 gram of calcined sodium carbonate, cooling to 40° C. within half-an-hour, squeezing out the material between the balls of the hands 10 times by dipping it into the bath, taking it out and squeezing it, and finally rinsing it in cold water and drying it.

The bases, identified by the above formula, are obtainable, for instance, by condensing the corresponding nitrobenzene-sulfo-chloride with a diphenylamine and reducing the condensation product thus obtained.

The properties of some of these bases are as follows:

| | Melting point |
|---|---|
| 1 - aminobenzene-5-sulfodiphenylamide—colorless crystals. | 102° C. |
| 1 - amino - 2-methylbenzene-5-sulfodiphenylamide — colorless crystals | 149° C. to 152° C. |
| 1 - amino-2-methoxybenzene-5-sulfodiphenylamide — colorless crystals | 129° C. to 130° C. |
| 1 - amino - 2-chlorobenzene - 5-sulfodiphenylamide — colorless crystals | 133° C. to 135° C. |

The following examples serve to illustrate the invention, but they are not intended to limit it thereto:

Dyeing prescriptions for the Examples 1 and 2

50 grams of well boiled cotton yarn are impregnated for half-an-hour with the grounding liquor, squeezed or hydroextracted and dyed for half-an-hour in the dye-bath. Thereupon, the dyed yarn is well rinsed, soaped at the boil with 2 grams of Marseilles' soap and 1 gram of sodium carbonate per liter, rinsed and dried.

(1) a. Grounding liquor 5 grams of 1(2'3'-hydroxynaphthoylamino) - 2-methoxybenzene are dissolved in boiling water in known manner with
10 cc. of Turkey red oil of 50 per cent. strength and
7.5 cc. of caustic soda solution of 34° Bé.; after cooling to 50° C.
5 cc. of formaldehyde of 33 per cent. strength are added and the whole is made up with water to
1000 cc.;

b. Dye-bath 3.59 grams of 1-amino-2-methoxybenzene-5-sulfodiphenylamide are diazotized with
3.1 cc. of hydrochloric acid of 20° Bé. and
8 cc. of sodium nitrite 1:10.
After addition of
10 grams of sodium acetate and
25 grams of sodium chloride, the diazo-solution is made up with water to
1000 cc.

A middle red of good fastness to light, to washing and to chlorine is obtained.

The dyestuff has the following formula:

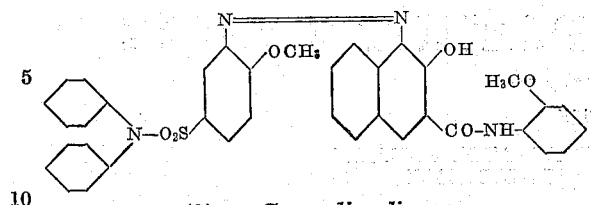

(2) a. Grounding liquor

| | | |
|---|---|---|
| 6 grams | of | 1(2'3'-hydroxynaphthoylamino)-4-methoxybenzene are dissolved in boiling water in known manner with |
| 10 | cc. | of Turkey red oil of 50 per cent. strength and |
| 10 | cc. | of caustic soda solution of 34° Bé.; the whole is then cooled, mixed with |
| 6 | cc. | of formaldehyde of 33 per cent. strength and made up with water to |
| 1000 | cc. | | b. Dye-bath

| | | |
|---|---|---|
| 3.39 grams | of | 1-amino-2-methylbenzene-5-sulfodiphenylamide are diazotized with |
| 3.1 | cc. | of hydrochloric acid of 20° Bé. and |
| 8 | cc. | of sodium nitrite 1:10. After addition of |
| 10 | grams | of sodium acetate and |
| 25 | grams | of sodium chloride the whole is made up with water to |
| 1000 | cc. | |

A yellowish red of good fastness to light, to washing and to chlorine is obtained.

The dyestuff has the following formula:

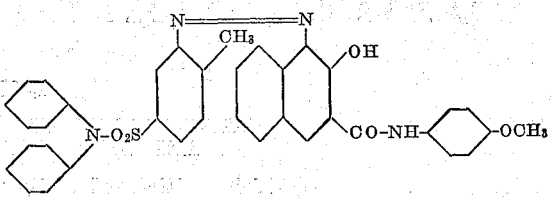

(3) 35.9 parts by weight of 1-aminobenzene-5-sulfodiphenylamide are diazotized in usual manner in a hydrochloric acid solution with 7 parts by weight of sodium nitrite. The diazo-compound is run into a finely dispersed suspension of 26.3 parts of 2.3-hydroxynaphthoyl-aminobenzene. By slowly adding, drop by drop, a solution of sodium acetate or sodium carbonate, the free mineral acid is rendered neutral. After the coupling is finished, the dyestuff is filtered by suction, washed for a short time and dried. It forms a scarlet-red powder.

The dyestuff has the following formula:

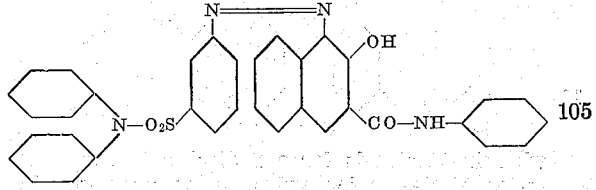

The following table indicates a number of other combinations obtainable according to the present process but does not comprise all possibilities for the preparation of dyestuffs by using different components; it, therefore, is not intended to limit the invention to the dyestuffs mentioned therein.

| | Diazotizing component | Coupling component | Tint |
|---|---|---|---|
| (1) | 1-amino-2-methoxybenzene-5-sulfodiphenylamide | 1(2'3'-hydroxynaphthoylamino)-4-methoxybenzene | Middle red |
| (2) | 1-amino-2-methoxybenzene-5-sulfodiphenylamide | 1(2'3'-hydroxynaphthoylamino)-naphthalene | Middle red |
| (3) | 1-amino-2-methoxybenzene-5 sulfodiphenylamide | 2(2'3'-hydroxynaphthoylamino)-naphthalene | Bluish-red |
| (4) | 1-amino-2-methoxybenzene-5-sulfodiphenylamide | 1(2'3'-hydroxynaphthoylamino)-2-methyl-4-chlorobenzene | Vivid bluish-red |
| (5) | 1-amino-2-methoxybenzene-5-sulfodiphenylamide | 1(2'3'-hydroxynaphthoylamino)-3-nitrobenzene | Vivid bluish-red |
| (6) | 1-amino-2-methoxybenzene-5-sulfodiphenylamide | 2.3-hydroxynaphthoylaminobenzene | Yellowish-red |
| (7) | 1-amino-2-methoxybenzene-5-sulfodiphenylamide | 1(2'3'-hydroxynaphthoylamino)-2-methylbenzene | Middle red |
| (8) | 1-amino-2-methoxybenzene-5-sulfodiphenylamide | 1(2'3'-hydroxynaphthoylamino)-2.4-dimethoxy-3-chlorobenzene | Vivid yellowish-red |
| (9) | 1-amino-2-methoxybenzene 5-sulfodiphenylamide | 1(2'3'-hydroxynaphthoylamino)-2.5-dimethoxy-4-chlorobenzene | Yellowish-red |
| (10) | 1-amino-2-methoxybenzene-5-sulfodiphenylamide | 1(2'3'-hydroxynaphthoylamino)-2-ethoxybenzene | Scarlet |
| (11) | 1-amino-2-methoxybenzene-5-sulfodiphenylamide | 1(2'3'-hydroxynaphthoylamino)-2.4-dimethoxy-5-chlorobenzene | Bluish-red |
| (12) | 1-amino-2-methoxybenzene-5-sulfodiphenylamide | 1(2'3'-hydroxynaphthoylamino)-2-methyl-5-chlorobenzene | Vivid bluish-red |
| (13) | 1-amino-2-methoxybenzene-5-sulfodiphenylamide | 1(2'3'-hydroxynaphthoylamino)-4-methylbenzene | Vivid yellowish-red |
| (14) | 1-amino-2-methoxybenzene-5-sulfodiphenylamide | 1(2'3'-hydroxynaphthoylamino)-2-methoxy-5-chlorobenzene | Vivid yellowish-red |
| (15) | 1-amino-2-methoxybenzene-5-sulfodiphenylamide | 1(2'3'-hydroxynaphthoylamino)-4-chlorobenzene | Vivid yellowish-red |
| (16) | 1-amino-2-methoxybenzene-5-sulfodiphenylamide | 1(2'3'-hydroxynaphthoylamino)-2.5-dimethoxybenzene | Yellowish-red |
| (17) | 1-amino-2-methoxybenzene-5-sulfodiphenylamide | 1(2'3'-hydroxynaphthoylamino)-2-methyl-4-methoxybenzene | Bluish-red |
| (18) | 1-amino-2-methylbenzene-5-sulfodiphenylamide | 1(2'3'-hydroxynaphthoylamino)-2-methoxybenzene | Vivid scarlet |
| (19) | 1-amino-2-methylbenzene-5-sulfodiphenylamide | 1(2'3'-hydroxynaphthoylamino)-naphthalene | Vivid scarlet |
| (20) | 1-amino-2-methylbenzene-5-sulfodiphenylamide | 2(2'3'-hydroxynaphthoylamino)-naphthalene | Yellowish-red |
| (21) | 1-amino-2-methylbenzene-5-sulfodiphenylamide | 1(2'3'-hydroxynaphthoylamino)-2-methyl-4-chlorobenzene | Vivid scarlet |
| (22) | 1-amino-2 methylbenzene-5-sulfodiphenylamide | 1(2'3'-hydroxynaphthoylamino)-2-methylbenzene | Vivid scarlet |
| (23) | 1-amino-2-methylbenzene-5-sulfodiphenylamide | 1(2'3'-hydroxynaphthoylamino)-2-methoxy-4-chlorobenzene | Scarlet |
| (24) | 1-amino-2-methylbenzene-5-sulfodiphenylamide | 2.3-hydroxynaphthoylamino-benzene | Vivid scarlet |
| (25) | 1-amino-2-methylbenzene-5-sulfodiphenylamide | 1(2'3'-hydroxynaphthoylamino)-3-nitrobenzene | Vivid scarlet |
| (26) | 1-amino-2-methylbenzene-5-sulfodiphenylamide | 1(2'3'-hydroxynaphthoylamino)-4-chlorobenzene | Vivid scarlet |
| (27) | 1-amino-2-methylbenzene-5-sulfodiphenylamide | 1(2'3'-hydroxynaphthoylamino)-4-methylbenzene | Vivid scarlet |
| (28) | 1-amino-2-methylbenzene-5-sulfodiphenylamide | 1(2'3'-hydroxynaphthoylamino)-2-ethoxybenzene | Vivid scarlet |
| (29) | 1-amino-2-methylbenzene-5-sulfodiphenylamide | 1(2'3'-hydroxynaphthoylamino)-2-methyl-5-chlorobenzene | Vivid scarlet |
| (30) | 1-amino-2-methylbenzene-5-sulfodiphenylamide | 1(2'3'-hydroxynaphthoylamino)-2.4-dimethoxy-3-chlorobenzene | Vivid scarlet |
| (31) | 1-amino-2-methylbenzene-5-sulfodiphenylamide | 1(2'3'-hydroxynaphthoylamino)-2-methyl-4-methoxybenzene | Yellowish-red |
| (32) | 1-amino-2-methylbenzene-5-sulfodiphenylamide | 1(2'3'-hydroxynaphthoylamino)-2.4-dimethoxy 5-chlorobenzene | Middle red |
| (33) | 1-aminobenzene-5-sulfodiphenylamide | 1(2'3'-hydroxynaphthoylamino)-2-methyl-4-chlorobenzene | Scarlet |
| (34) | 1-aminobenzene-5-sulfodiphenylamide | 1(2'3'-hydroxynaphthoylamino)-2-methoxy-4-chlorobenzene | Scarlet |
| (35) | 1-aminobenzene-5-sulfodiphenylamide | 1(2'3'-hydroxynaphthoylamino)-2-methoxybenzene | Scarlet |

Since an object of the present invention is to provide dyestuffs of good fastness properties, which dyestuffs are insoluble in water and alkalies, it is to be understood that the aromatic nuclei of the general formulae appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

I claim:

1. The water-insoluble mono-azodyestuffs of the following general formula:

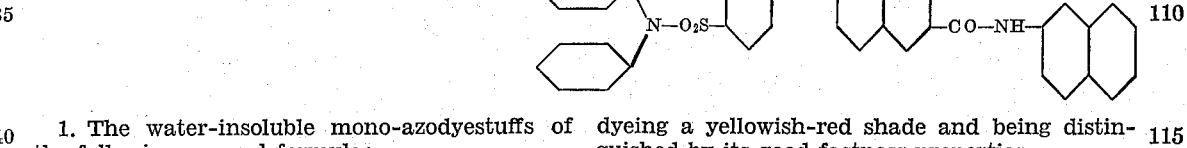

wherein R stands for a radical of the benzene series, X stands for hydrogen, halogen, an alkyl or alkoxy group and Z stands for a radical of the benzene or naphthalene series, dyeing clear scarlet to bluish-red shades and being distinguished by their good fastness properties.

2. The water-insoluble mono-azodyestuffs of the following general formula

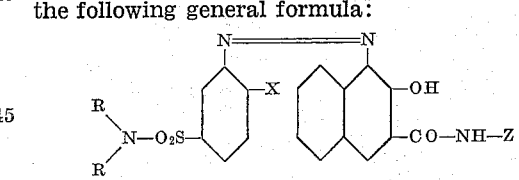

wherein X stands for a methyl or methoxy group and Z stands for a radical of the benzene or naphthalene series, dyeing clear scarlet to bluish-red shades and being distinguished by their good fastness properties.

3. The water-insoluble mono-azodyestuff of the following formula:

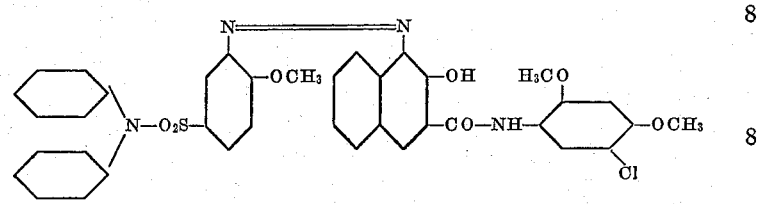

dyeing a bluish-red shade and being distinguished by its good fastness properties.

4. The water-insoluble mono-azodyestuff of the following formula:

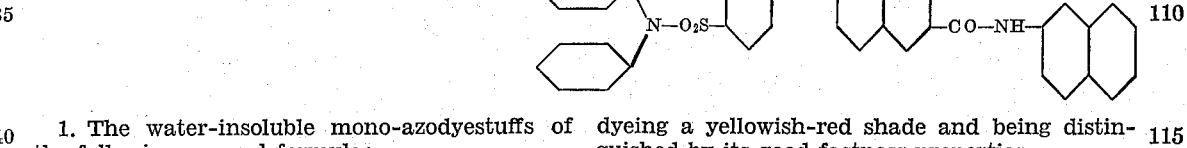

dyeing a vivid scarlet shade and being distinguished by its good fastness properties.

5. The water-insoluble mono-azodyestuff of the following formula:

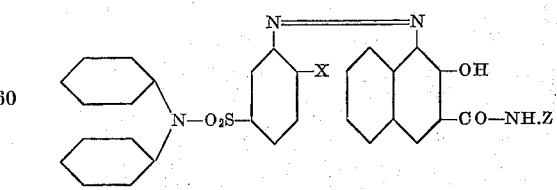

dyeing a yellowish-red shade and being distinguished by its good fastness properties.

6. Fiber dyed with the mono-azodyestuffs as claimed in claim 1.

7. Fiber dyed with the mono-azodyestuffs as claimed in claim 2.

8. Fiber dyed with the mono-azodyestuff as claimed in claim 3.

9. Fiber dyed with the mono-azodyestuff as claimed in claim 4.

10. Fiber dyed with the mono-azodyestuff as claimed in claim 5.

HEINZ EICHWEDE.